(12) United States Patent
Ozaki (10) Patent No.: US 10,977,688 B2
(45) Date of Patent: Apr. 13, 2021

(54) INFORMATION PROCESSING APPARATUS, INFORMATION PROCESSING METHOD AND PROGRAM

(71) Applicant: Rakuten, Inc., Tokyo (JP)

(72) Inventor: Shimpei Ozaki, Tokyo (JP)

(73) Assignee: Rakuten, Inc., Tokyo (JP)

( * ) Notice: Subject to any disclaimer, the term of this patent is extended or adjusted under 35 U.S.C. 154(b) by 115 days.

(21) Appl. No.: 15/974,827

(22) Filed: May 9, 2018

(65) Prior Publication Data

US 2018/0330401 A1    Nov. 15, 2018

(30) Foreign Application Priority Data

May 10, 2017  (JP) .............................. JP2017-094285

(51) Int. Cl.

| G06Q 30/00  | (2012.01) |
| G06Q 30/02  | (2012.01) |
| H04N 21/482 | (2011.01) |
| G06F 16/9537 | (2019.01) |

(52) U.S. Cl.
CPC ..... G06Q 30/0255 (2013.01); G06F 16/9537 (2019.01); H04N 21/4826 (2013.01)

(58) Field of Classification Search
None
See application file for complete search history.

(56) References Cited

U.S. PATENT DOCUMENTS

2017/0372362 A1* 12/2017 Gavriliu ............. G06Q 30/0259

FOREIGN PATENT DOCUMENTS

JP          2011-090353 A     5/2011

* cited by examiner

*Primary Examiner* — Michael W Schmucker
(74) *Attorney, Agent, or Firm* — Sughrue Mion, PLLC

(57) ABSTRACT

An index calculation unit of a server calculates a Pre-Ad rank value that is a first index, on the basis of a GMS value and a unique users value. A list generation unit generates a list of display-candidate advertisements selected on the basis of the first indexes, the list including location information of the advertisements, and sends the list to a user terminal. A match level determination unit of the user terminal 3 calculates a correlation between a user and the product in relation to the user. An individual index calculation unit calculates an Ad rank value that is a second index, on the basis of the first index and the correlation. An advertisement choosing unit specifies a number of advertisements to be displayed and, on the basis of the second indexes, chooses the specified number of advertisements from among the advertisements of the one or more products.

6 Claims, 7 Drawing Sheets

| SELLER NAME | PRODUCT | GMS | UU | MARGIN |
|---|---|---|---|---|
| SELLER A | PRODUCT 1 | 6M | 40 | 20% |
| | PRODUCT 2 | 3M | 30 | 20% |
| | PRODUCT 3 | 5M | 70 | 20% |
| SELLER B | PRODUCT 4 | 9M | 70 | 20% |
| | PRODUCT 5 | ⋮ | ⋮ | ⋮ |
| | PRODUCT 6 | ⋮ | ⋮ | ⋮ |
| SELLER C | PRODUCT 7 | ⋮ | ⋮ | ⋮ |
| | PRODUCT 8 | ⋮ | ⋮ | ⋮ |
| | PRODUCT 9 | ⋮ | ⋮ | ⋮ |
| ⋮ | ⋮ | ⋮ | ⋮ | ⋮ |

FIG. 5

| LIST | URL | Pre−Adrank (GMS÷UU×MARGIN) | PRODUCT ADVERTISEMENT | CATEGORY |
|---|---|---|---|---|
| 1 | http://⋯⋯ | 30,000 | PRODUCT 1 | A |
| 2 | http://⋯⋯ | 25714.28571 | PRODUCT 4 | B |
| 3 | http://⋯⋯ | 20,000 | PRODUCT 2 | C |
| ⋮ | ⋮ | ⋮ | ⋮ | ⋮ |

INFORMATION PROCESSING APPARATUS, INFORMATION PROCESSING METHOD AND PROGRAM

This application is based on and claims the benefit of priority from Japanese Patent Application No. 2017-094285, filed on May 10, 2017, the content of which is incorporated herein by reference.

BACKGROUND OF THE INVENTION

Field of the Invention

The present invention relates to an information processing apparatus, an information processing method and a program.

Related Art

Heretofore, it has been common to accept advertisements from a range of advertisers and display the advertisements on web pages being viewed by users. For example, services that display advertisements relating to keywords used by users in searches (search word advertising) and suchlike have been provided. In addition to these technologies, as a technology for displaying advertisements that are more useful for users, there is a technology that gives consideration to click-through rates (CTR), user attributes and the like when choosing advertisements to be served (see Japanese Unexamined Patent Application, Publication No. 2011-90353).

SUMMARY OF THE INVENTION

In recent years, there have been calls to give consideration not just to user attributes but also to viewing histories, purchase histories and the like that are modified in real time when choosing advertisements to be served. However, with conventional technologies as in Japanese Unexamined Patent Application, Publication No. 2011-90353, server loads are high. In particular, server loads are very high when web page requests are at high volumes, and it has not been possible to satisfy these calls. This situation similarly applies to broader content as well as to advertisements.

The present invention has been devised in consideration of these circumstances, and it is an object of the present invention to moderate a load on a server when choosing content such as advertisements and the like to be served with consideration to both of user attributes and of a viewing history, purchase history or the like that is modified in real time.

In order to achieve the object described above, an aspect of an information processing apparatus of the present invention is an information processing apparatus including a processor and a memory, wherein the processor executes a program stored in the memory to perform operations including:

calculating, for each of pieces of display-candidate content relating to a product to be assigned through a predetermined website, a first index representing a priority level for display of the display-candidate content;

selecting a predetermined number of pieces of display-candidate content on the basis of the first index; and generating a list including the first indexes and pieces of location information about the selected pieces of display-candidate content, and sending the list to another information processing apparatus, wherein the another information processing apparatus includes a processor and a memory, in the another information processing apparatus, the processor executes a program stored in the memory to perform operations comprising:

acquiring the list sent from the information processing apparatus;

on the basis of an operation history of a user that is acquired by the another information processing apparatus, calculating a second index representing a user-specific priority level for display of the display-candidate content included in the list;

on the basis of the first index and the second index, choosing content to be acquired among the pieces of display-candidate content included in the list; and acquiring the chosen content on the basis of the location information, and displaying the chosen content.

According to the present invention, when both a user attribute and a viewing history, purchase history or the like that is modified in real time are given consideration when choosing advertisements to be served, because processing to choose the advertisements with consideration of the user attribute is distributed processing performed at the user terminal, a load on the server may be moderated. In general, there is concern that distributed processing being performed at a user terminal increases amounts of content data such as images and the like that are sent from a server to the user terminal and that the load of communications processing is increased. In the present invention, however, in regard to content such as advertisements and the like of display-candidates selected with consideration to a viewing history, purchase history or the like, the content data itself is not sent but text data representing location information of the content is sent. Therefore, an increase in amounts of data being sent may be moderated.

DETAILED DESCRIPTION OF THE INVENTION

Figure 1:
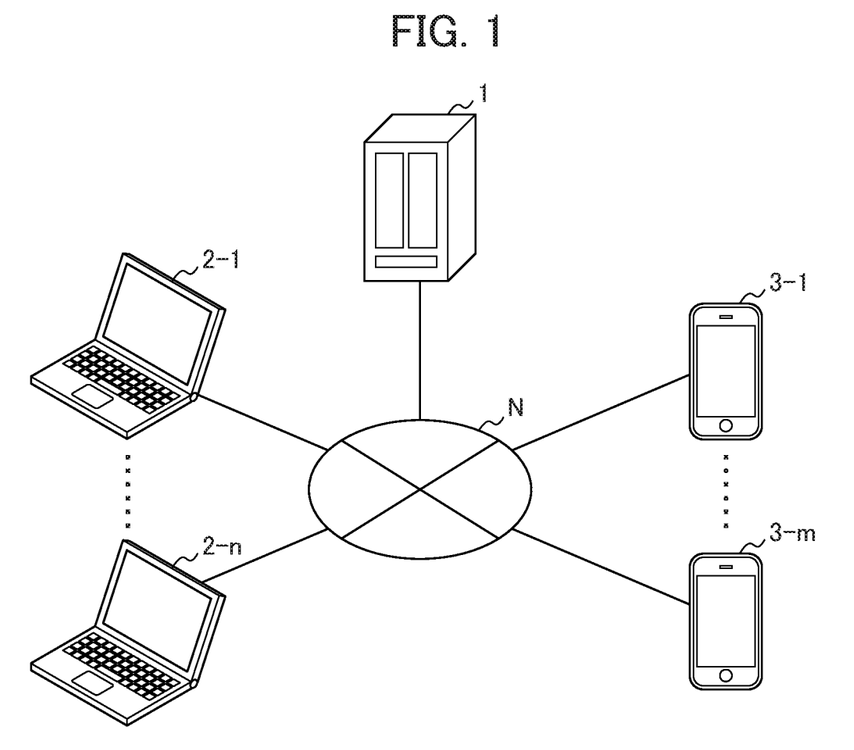
FIG. 1 is a block diagram depicting an outline of an information processing system according to an embodiment of the present invention.

In the following, an embodiment of the present invention is explained using the attached drawings. FIG. 1 is a block diagram showing an outline of an information processing system according to the embodiment of the present invention.

First, before the embodiment of the present invention is described, a service to which the information processing system according to the embodiment of the present invention is applied (below referred to as "the present service") is briefly described. The present service is a service that presents advertisements for products from sellers in a website that sells the products from the sellers to users, or in another website. That is, the provider of the present service sells products ordered from the sellers to users through the website, and presents advertisements for the products to the users via the website. A user is a person who views the website, may purchase the products, and views advertisements presented on the website. The meaning of the term "products" as used herein is intended to include products that are presented or may be presented for sale on the website. The website that presents one or more products and sells the same to users is below referred to as "the selling site".

As shown in FIG. 1, the information processing system according to the embodiment of the present invention includes a server 1 that is administered by the provider of the present service, n seller terminals 2-1 to 2-n (n being an arbitrary integer value of at least 1) that are used by respective sellers, and m user terminals 3-1 to 3-m (m being an arbitrary integer of at least 1 that is independent of n) that are used by respective users. The server 1 is interconnected with each of the seller terminals 2-1 to 2-n and user terminals 3-1 to 3-m via a network N such as the Internet or the like.

Below, where there is no need to individually distinguish the respective seller terminals 2-1 to 2-n, the same are referred to in general as "the seller terminals 2", and where there is no need to individually distinguish the respective user terminals 3-1 to 3-m, the same are referred to in general as "the user terminals 3".

Figure 2:
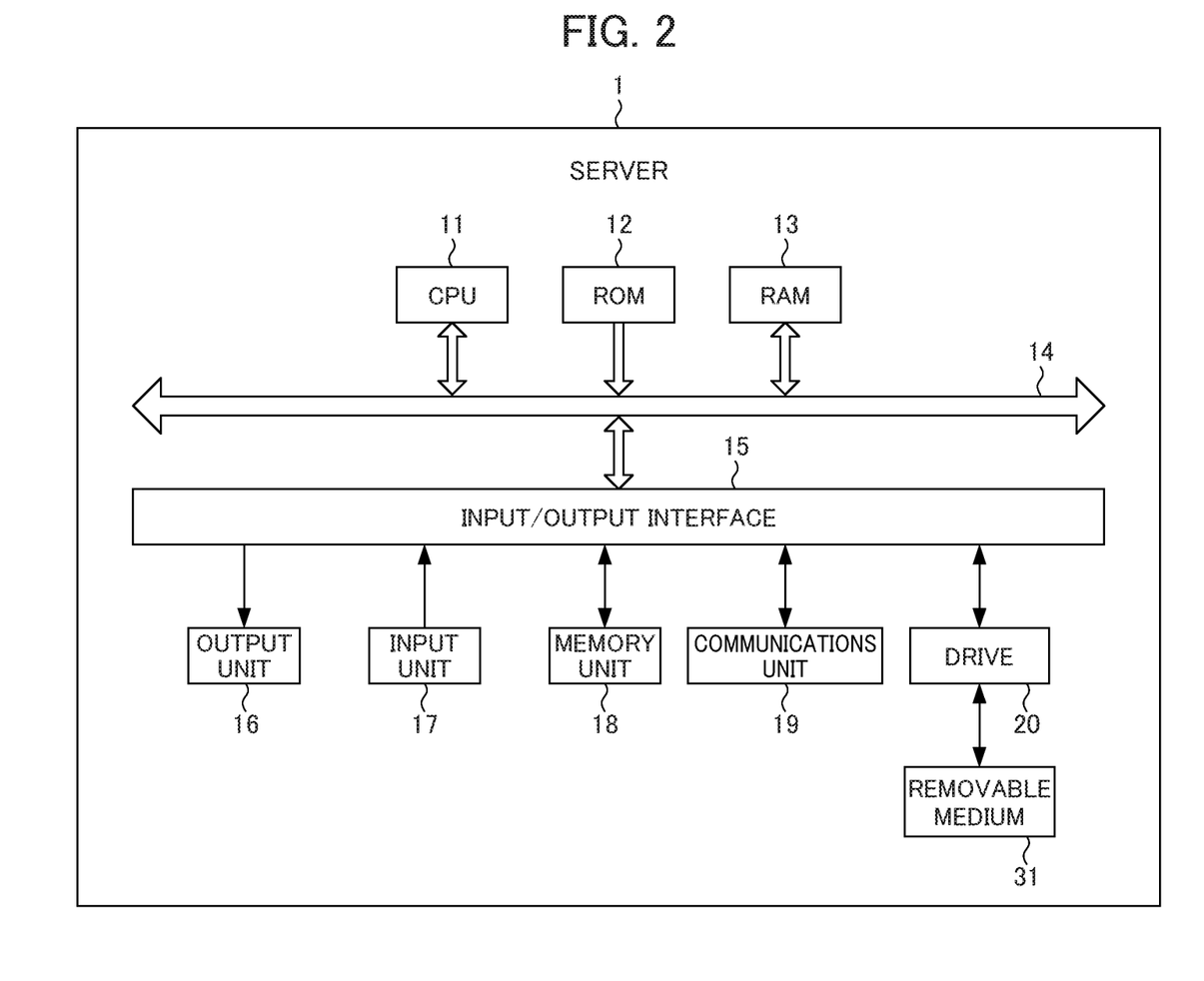
FIG. 2 is a block diagram depicting an example of a hardware configuration of a server according to the embodiment of the present invention.

FIG. 2 is a block diagram depicting an example of a hardware configuration of the server of the information processing system in FIG. 1.

The server 1 is equipped with a central processing unit (CPU) 11, a read-only memory (ROM) 12, a random access memory (RAM) 13, a bus 14, an input/output interface 15, an output unit 16, an input unit 17, a memory unit 18, a communications unit 19 and a drive 20. The CPU serves as a processor.

The CPU 11 executes various processes in accordance with a program stored in the ROM 12 or a program loaded into the RAM 13 from the memory unit 18. Information required for execution of the various processes by the CPU 11 and suchlike is stored in the RAM 13 as appropriate.

The CPU 11, the ROM 12 and the RAM 13 are connected to one another via the bus 14. The input/output interface 15 is also connected to the bus 14. The output unit 16, the input unit 17, the memory unit 18, the communications unit 19 and the drive 20 are connected to the input/output interface 15.

The output unit 16 is structured with various kinds of hardware such as a liquid crystal display and a speaker, and outputs various kinds of information. The input unit 17 is structured with various kinds of hardware such as a keyboard and a mouse, and inputs various kinds of information.

The memory unit 18 is structured with a hard disc, a dynamic random access memory (DRAM) or the like, and memorizes various kinds of information. The communications unit 19 controls communications with other equipment (for example, in the example in FIG. 1, the seller terminals 2, the user terminals 3 and the like) via the network N, which includes the Internet.

The drive 20 is provided as appropriate. A removable medium 31 formed with a magnetic disk, an optical disk, a magneto-optical disk, a semiconductor memory, or the like is installed in the drive 20 as appropriate. As required, a program read from the removable medium 31 by the drive 20 is installed in the memory unit 18. Similarly to the memory unit 18, the removable medium 31 may also store the various kinds of information that are stored in the memory unit 18.

The seller terminals 2 and user terminals 3 are appropriately structured by various devices such as personal computers, portable terminals and the like. Hardware configurations inside the seller terminals 2 and user terminals 3 may be basically the same as the configuration of the server 1, and are not described here.

Various kinds of processing may be executed at the server 1 and the user terminals 3 structured as described above by various kinds of hardware and software interoperating at the server 1 and the user terminals 3.

Figure 3:
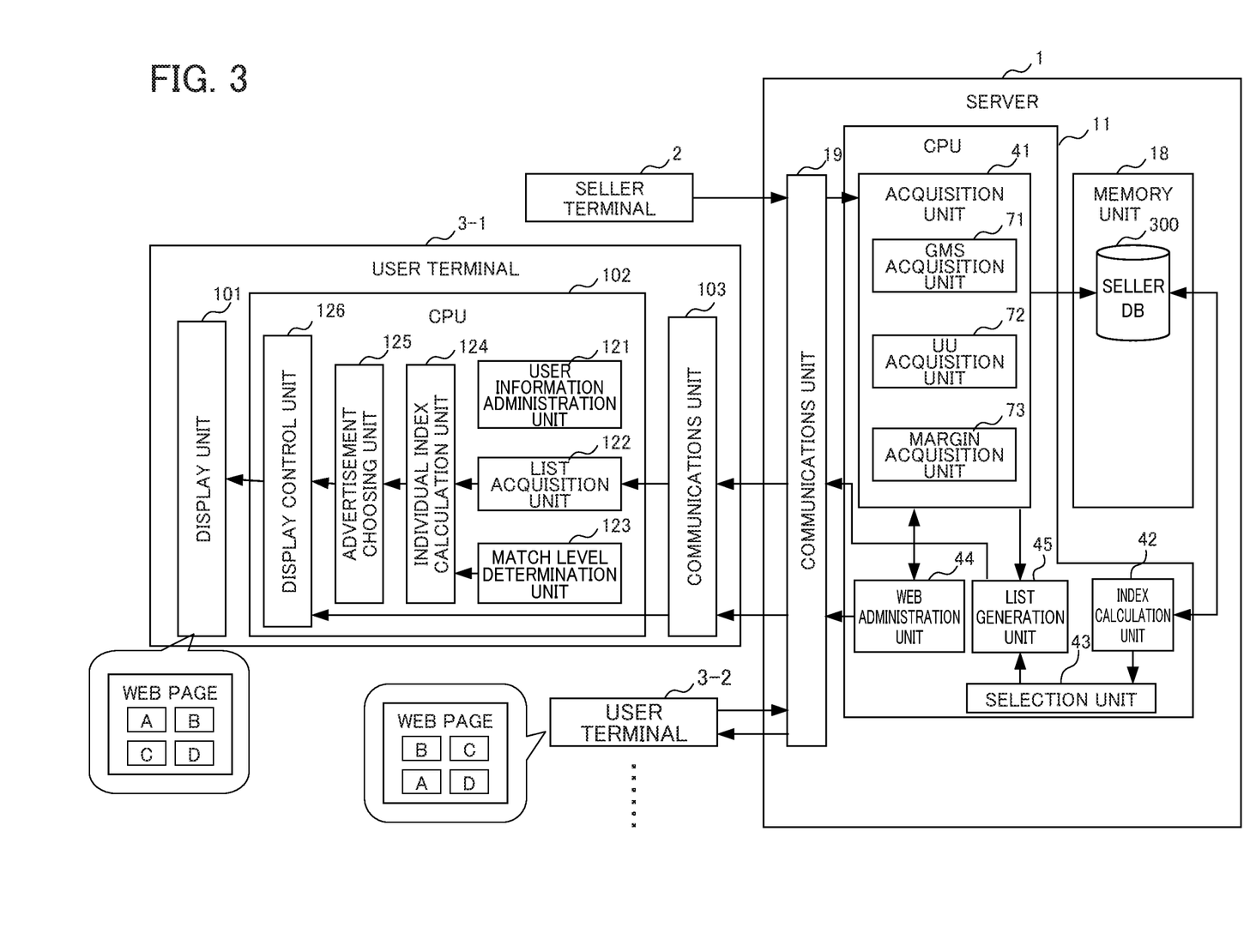
FIG. 3 is a functional block diagram depicting a functional structure example of a server 1 in FIG. 2 when individual index calculation processing is being executed and a user terminal 3 when terminal side advertisement display processing is being executed.

For example, the server 1 includes functional structures as illustrated in FIG. 3 for the execution of various kinds of processing, including individual index calculation processing. The term "individual index calculation processing" as used herein encompasses a sequence of processing including, in relation to a product to be assigned via the selling site: calculating first indexes (for example, "Pre-Ad rank" values, which are described below) representing priority levels for displaying advertisements of display-candidates; selecting content of a number of the display-candidates on the basis of the first indexes; generating a list (below referred to as "the advertisement list") including the first index and content location information for the content of each selected display-candidate; and sending the advertisement list to one of the user terminals 3.

The user terminal 3 may include functional structures as shown in FIG. 3 for the execution of various kinds of processing, including terminal side advertisement display processing. The term "terminal side advertisement display processing" as used herein encompasses a sequence of processing including: acquiring an advertisement list sent from the server 1; on the basis of an activity history of a user of the user terminal 3, calculating second indexes (for example, "Ad rank" values, which are described below) representing user-specific priority levels for display of advertisements of the display-candidates included in the advertisement list; on the basis of the first indexes and the second indexes, choosing advertisements to be acquired among the advertisements of display-candidates included in the advertisement list; acquiring the chosen content on the basis of the location information thereof; and displaying the corresponding advertisements.

FIG. 3 is a functional block diagram depicting a functional structure example of the server 1 in FIG. 2 when the individual index calculation processing is being executed and the user terminal 3 when the terminal side advertisement display processing is being executed.

As illustrated in FIG. 3, the CPU 11 of the server 1 functions as an acquisition unit 41, an index calculation unit 42, a selection unit 43, a web administration unit 44, and a list generation unit 45. A seller database 300 is provided in a region of the memory unit 18 of the server 1.

The acquisition unit 41 of the server 1 acquires various kinds of information sent from the seller terminals 2 and the user terminals 3, and stores this information in the seller database 300 as appropriate. To be specific, the acquisition unit 41 is provided with a GMS acquisition unit 71, a UU acquisition unit 72 and a margin acquisition unit 73. The GMS acquisition unit 71, the UU acquisition unit 72 and the margin acquisition unit 73 acquire various kinds of information for respective units, each unit being one product. A product that is treated as one unit by the acquisition unit 41 is, for convenience of description herein, a single type of product handled by a single seller. That is, when products are assigned product IDs by the selling site, if different sellers are selling products that are the same, those products are treated as different units. Single units are not particularly limited to being products. For example, it is possible for products to be assigned the same ID by the selling site. Herebelow, a product that is treated as a single unit by the acquisition unit 41 and the like is referred to as a "unit product".

The GMS acquisition unit 71 acquires information relating to a sale price and sale quantity of a unit product from a log of the selling site (a storage location of the log is not shown in the drawings) administered by the web administration unit 44 of the server 1, which is described below, or from the seller terminals 2 or the like, and stores this information in the seller database 300. In the present embodiment, the GMS value of a unit product is defined as a value calculated by multiplying the sale quantity by the sale price of the unit product. Descriptions are given using this GMS value. The term "sale quantity" refers to, for example, a number of the unit product sold through the selling site in a predetermined period. That is, the GMS acquisition unit 71 acquires information relating to the GMS values of the unit products and stores this information in the seller database 300.

The UU acquisition unit 72 acquires information relating to a number of people who have viewed a web page on which the unit product is presented (below referred to as "unique users" or "UU"), from a log of the selling site (a storage location of the log is not shown in the drawings) administered by the web administration unit 44, which is described below, and stores this information in the seller database 300.

The margin acquisition unit 73 acquires information relating to a proportion (below referred to as "the margin") from a log of the selling site (a storage location of the log is not shown in the drawings) administered by the web administration unit 44 of the server 1, which is described below, or from the seller terminals 2 or the like. The margin acquisition unit 73 stores this information in the seller database 300. The margin is set for advertisements of the unit product by a party selling the unit product (the seller).

Thus, in the present embodiment, the unit products are items administered and sold by respective sellers. One advertisement is generated for each unit product, as described below. The advertiser of the advertisement is the seller. Accordingly, information relating to the unit products such as the GMS value, UU and the like of each unit product and various other kinds of information relating to the seller (advertiser) are stored in the seller database 300 for each seller.

The index calculation unit 42 extracts information relating to the unit products (the GMS value, UU and the like) from the seller database 300 for each of one or more unit products that may be advertised. The index calculation unit 42 calculates the first index for each of the one or more unit products that may be advertised on the basis of the various kinds of information relating to the unit product (the GMS value, the UU and the like). The first index is an index representing, for an advertisement of a display-candidate relating to a product that is to be assigned through the selling site, a priority level for display of that advertisement. In the present embodiment, an index referred to as "Pre-Ad rank" is employed as the first index.

The selection unit 43 selects a predetermined number of the advertisements of the display-candidates on the basis of the Pre-Ad rank values.

The web administration unit 44 administers the selling site and executes control to display the selling site at each user terminal 3 accessing the selling site.

In the present embodiment, parameters used in the calculation of a Pre-Ad rank value such as the GMS value, UU and the like do not necessarily have to be acquired in relation to a route through the advertisement of the product. That is, these various parameters may be acquired to depend on a number of routes including at least a route other than the advertisement. Therefore, the Pre-Ad rank value for serving content of a product may be calculated on the basis of past results such as sales of the product and the like, including sales by routes other than the advertisement. As a result, advertisement serving may be more appropriate.

The list generation unit 45 generates an advertisement list of advertisements of display-candidates selected by the selection unit 43. The advertisement list includes the Pre-Ad rank values, URLs (uniform resource locators) at which image data and the like are stored, and information representing categories of the corresponding unit products. The list generation unit 45 sends the advertisement list to the user terminal 3 via the communications unit 19. Details of the advertisement list are described using FIG. 5.

A CPU 102 of the user terminal 3 functions as a user information administration unit 121, a list acquisition unit 122, a match level determination unit match level determination unit 123, an individual index calculation unit 124, an advertisement choosing unit 125, and a display control unit 126.

The user information administration unit 121 administers user information such as an activity history of the user at the user terminal 3, a viewing history, attributes (sex, age and the like) and so forth. The activity history may be acquired by an arbitrarily selected method; for example, the activity history may be acquired by the provider of the present service associating a login ID with plural websites and web pages.

The list acquisition unit 122 acquires the advertisement list sent from the server 1 via a communications unit 103.

From the user information administered by the user information administration unit 121 (for example, the activity history of the user of the user terminal 3 and so forth), the match level determination unit 123 determines a correlation (below referred to as "the match level") between an individual user (the user using the user terminal 3 which is the object of processing) and each unit product of the advertisements of display-candidates included in the advertisement list. The match levels that are employed may be match levels between the user and each unit product itself. In the present embodiment, however, match levels with product categories to which the unit products belong are employed. In the present embodiment, an operation history of the website at the user terminal 3 is acquired by, for example, an add-on program or the like, and match levels for categories of users are calculated (determined) by a program installed at the user terminal 3 side. Methods of specifying and evaluating match level values may be arbitrarily selected. Descriptions of the present embodiment are given with the match level being evaluated into five levels, from 1 to 5.

The individual index calculation unit 124 calculates the second indexes (Ad rank values) representing user-specific priority levels for display of the advertisements of the display-candidates included in the advertisement list on the basis of the activity history of the user at the user terminal 3. For example, in the present embodiment, the individual index calculation unit 124 calculates an Ad rank value for each product advertisement (unit product) included in the advertisement list by multiplying the Pre-Ad rank value with the match level of the category of that unit product.

The advertisement choosing unit 125 sets a number of advertisement frames to be displayed on a web page of the selling site or the like, and chooses the set number of advertisements for unit products on the basis of the Ad rank values (the second indexes for user-specific priority levels) of the advertisements.

For each advertisement for a unit product chosen by the advertisement choosing unit 125, the display control unit 126 accesses the URL listed in the advertisement list and downloads image data of the advertisement. The display control unit 126 embeds the downloaded advertisement image data in an advertisement frame in the web page, and displays the advertisement at a display unit 101. The image data referred to here may be data of still images and may be data of video images.

Figure 4:
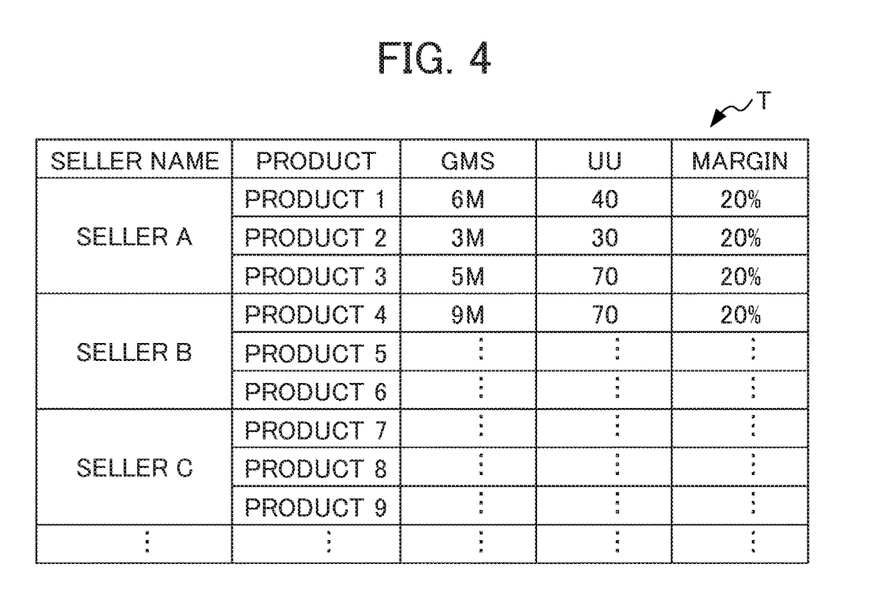
FIG. 4 is a diagram depicting an example of various kinds of information stored in a seller database at the server of FIG. 3.

FIG. 4 is a diagram depicting an example of (a table of) various kinds of information that are stored in the seller database 300. Table T depicted in FIG. 4 stores information relating to a seller name (store name), product, GMS, UU, and margin for each unit product. That is, any given row of Table T corresponds with a unit product. In the "seller name" field of any given row, the name of the seller handling the unit product corresponding to the any given row is stored. In the example, "Seller A" is displayed in the seller name field of the first row. This indicates that the name of the seller handling the unit product corresponding to this row is Seller A. In the "product" field of the row, information capable of identifying the unit product corresponding to the row is stored (in the example in FIG. 4, a product ID administered by each seller). In the example "Product 1" is displayed in the product field of the first row. This indicates that the product ID of the unit product corresponding to this row is Product 1. In the "GMS" field of the row, the GMS value of the unit product corresponding to the row is stored. In the example, "6M" is displayed in the GMS field of the first row. This indicates that the GMS value of the unit product corresponding to this row, which is to say Product 1 from Seller A, is 6,000,000. In the "UU" field of the row, the UU of the unit product corresponding to the row is stored. In the example, "40" is displayed in the UU field of the first row. This indicates that the UU of the unit product corresponding to this row, which is to say Product 1 from Seller A, is 40 users. In the "margin" field of the row, the margin of the unit product corresponding to the row is stored. In the example, "20%" is displayed in the margin field of the first row. This indicates that the margin of the unit product corresponding to this row, which is to say Product 1 from Seller A, is 20%.

Putting all these together, the first row at the top of Table T corresponds to a unit product with the ID Product 1 being handled by Seller A. Looking at this first row, it can be seen that the GMS value for the unit product Product 1 is 6M (6,000,000), the UU is 40 users, and the margin is 20%.

Similarly, the fourth row from the top of Table T corresponds to a unit product with the ID Product 4 being handled by Seller B. Looking at this fourth row, it can be seen that the GMS value for the unit product Product 4 from Seller B is 9M, the UU is 70, and the margin is 20%.

Various kinds of information as illustrated in FIG. 4 are memorized in the seller database 300. The various kinds of information stored in the seller database 300 are used by the server 1 for calculating Pre-Ad rank values.

Figure 5:
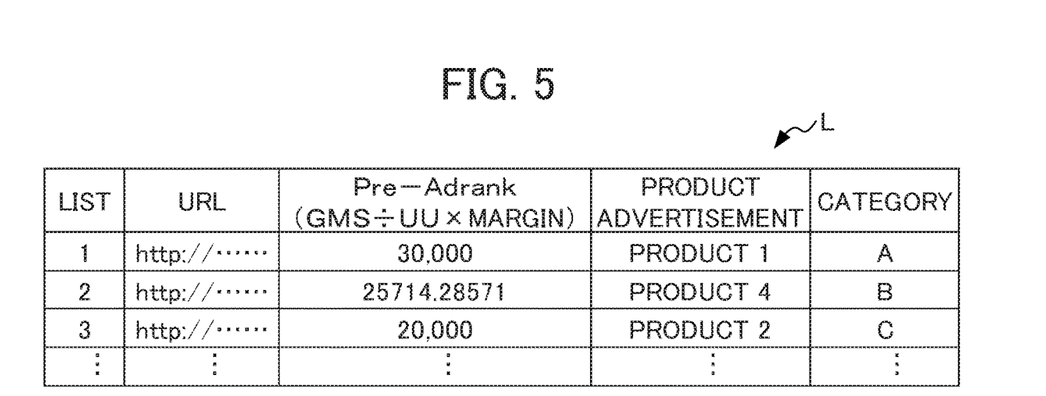
FIG. 5 is a diagram depicting an example of (a table of) various kinds of information structuring an advertisement list that is sent from the server in FIG. 3 to the user terminal.

FIG. 5 is a diagram depicting an example of (a table of) various kinds of information structuring the advertisement list that is sent from the server 1 in FIG. 3 to the user terminal 3.

Table L depicted in FIG. 5 stores information relating to a list position, URL, Pre-Ad rank, product advertisement, and category for each unit product. That is, row of Table L corresponds with an advertisement presenting one unit product (below referred to where appropriate as "the product advertisement"). Only a predetermined number of product advertisements, selected on the basis of the Pre-Ad rank values, are included in the advertisement list. In the list position field of the row, information capable of identifying the product advertisement corresponding to the row is stored (in the example in FIG. 5, a serial number administered for each advertisement). In the example, "1" is displayed in the list position field of the first row. This indicates that the serial number identifying the advertisement corresponding to this row is 1. In the URL field of the row, a URL of a website relating to the product advertisement corresponding to the row is stored. The user terminal 3 uses the URL to acquire image data and the like of the advertisement to the user terminal 3. In the Pre-Ad rank field of the row, the first index of the priority level of the product advertisement corresponding to the row, which is to say the Pre-Ad rank value, is stored. In the example, "30,000" is displayed in the field for the index of priority level of the first row. This indicates that the Pre-Ad rank value corresponding to this row is 30,000. In the product advertisement field of the row, information capable of identifying the advertisement for the unit product corresponding to the row, which is to say the product advertisement, is stored (the product ID administered by each seller in the example in FIG. 4). In the category field of the row, a category of the product advertisement corresponding to the row is stored. In the example, "A" is displayed in the category field of the first row. This indicates that the category of the product advertisement corresponding to this row, which is to say the product advertisement with list number 1 for Product 1, is A.

Figure 6:
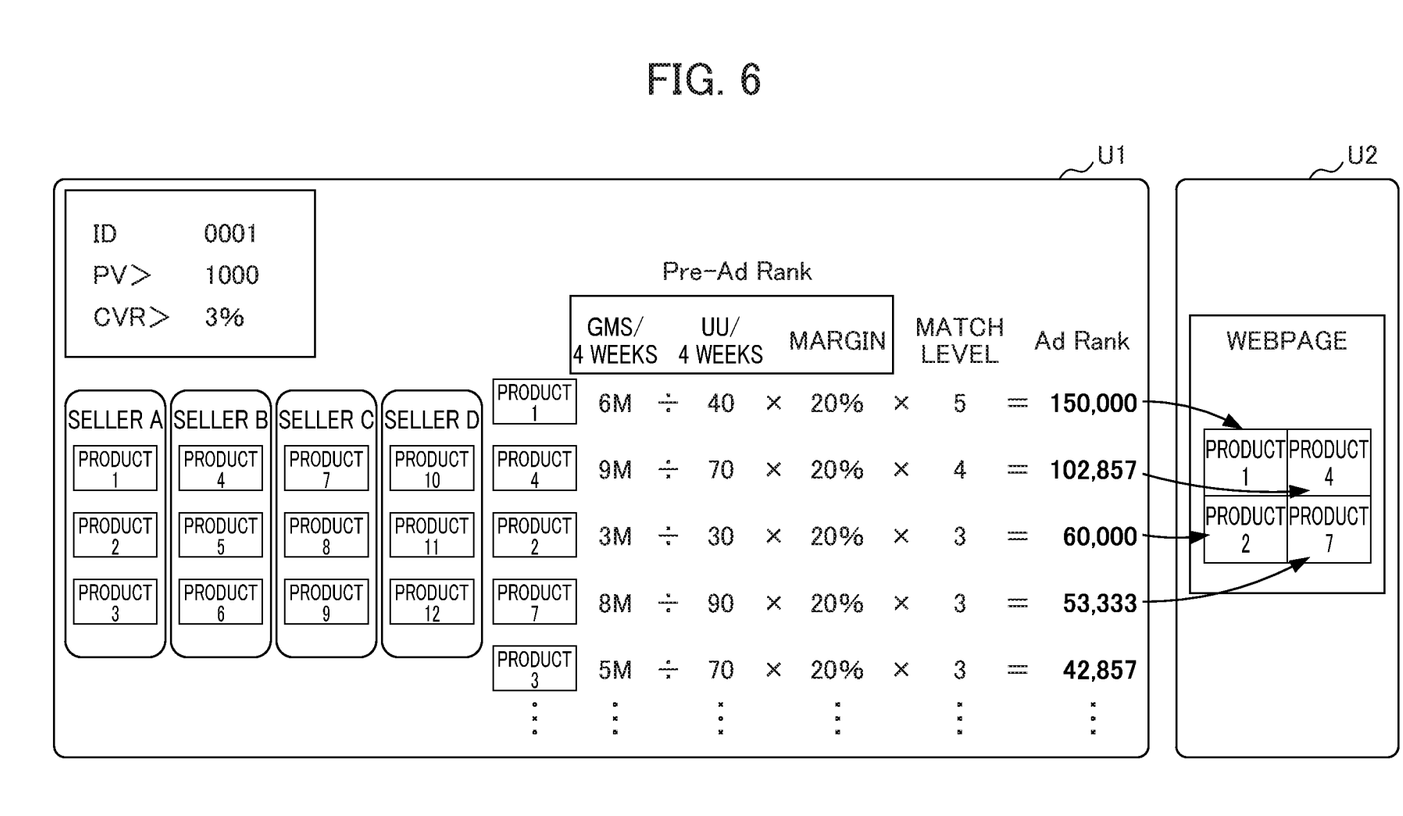
FIG. 6 is a diagram depicting an example of results of choosing advertisements to be displayed in the terminal side advertisement display processing executed by the user terminal 3.

FIG. 6 is a diagram depicting an example of results of choosing advertisements to be displayed in the terminal side advertisement display processing executed by the user terminal 3.

Results U1 at the left side of FIG. 6 contain an ID field at the top left of the drawing, indicating the value "0001". This represents an ID of a user. That is, this ID indicates a condition in which Ad rank values for the user identified by the user ID 0001 are calculated at the user terminal 3 of that user. Looking at the lower left of the drawing, "Seller A", "Seller B", "Seller C" and "Seller D" are indicated, corresponding to the seller names in FIG. 4. Below these, "Product 1" to "Product 12" are indicated, corresponding to the products in FIG. 4.

First, as an example, Product 1 from Seller A is described. In this example, as depicted in FIG. 4, Product 1 from Seller A has a GMS value of 6M, a UU of 40, and a margin of 20%. Consequently, Pre-Ad rank at the server 1 side is 30,000, and Product 1 is included in the advertisement list illustrated in FIG. 5 that is sent to the user terminal 3. According to the activity history of the user at the user terminal 3, the match level between Product 1 from Seller A and the user identified by user ID 0001 is 5. As illustrated in FIG. 6, the Ad rank result calculated on the basis of these values is expressed by the following expression (1).

$$\text{Ad rank} = \text{Pre-Ad rank} \times \text{match level(in which Pre-Ad rank of the unit product is GMS value} \div \text{UU (unique users)} \times \text{margin (advertisement proportion))} \quad (1)$$

Thus, for the user identified by user ID 0001, the Ad rank value of Product 1 from Seller A is 150,000. In the example in FIG. 6, the products are displayed in Ad rank order from the highest value.

Thus, the Ad rank values illustrated in the results U1 at the left side of FIG. 6 are calculated independently from the results U2 at the right side of FIG. 6. That is, the Ad rank values are calculated at the user terminal 3 side before advertisements are displayed at the user terminal 3 of the user identified by user ID 0001 (before the results U2 at the right side of FIG. 6). Thus, when there is a page request from the user terminal 3 of the user identified by user ID 0001 for a web page on which advertisements are to be presented, advertisements that are more appropriate for that user are displayed on the web page, as illustrated in the results U2 at the right side of FIG. 6. In the example of FIG. 6, the Ad rank of Product 1 from Seller A is 150,000, the Ad rank of Product 4 from Seller B is 102,857, the Ad rank of Product 2 from Seller A is 60,000, and the Ad rank of Product 7 from Seller C is 53,333.

In this example, as depicted in the results U2 at the right side of FIG. 6, the number of advertisements for unit products to be displayed on the web page is set to four. Accordingly, the advertisement choosing unit 125 of the user terminal 3 chooses advertisements for unit products down to the fourth highest value of Ad rank to be displayed on the web page. That is, the advertisement choosing unit 125 chooses the advertisements for Product 1, Product 4, Product 2 and Product 7 to be displayed. The advertisement choosing unit 125 then specifies an order of the advertisement results for respective positions in the four advertisement frames, choosing respective advertisement frames (location positions) for the four advertisements chosen to be displayed such that the advertisements with higher Ad rank results are disposed in higher positions. In the example in FIG. 6, the ranks of the advertisement results are specified in the order upper-left advertisement frame, upper-right advertisement frame, lower-left advertisement frame, lower-right advertisement frame. Therefore, the advertisement for Product 1 that has the highest Ad rank is disposed in the upper-left advertisement frame, the advertisement for Product 4 that has the second highest Ad rank is disposed in the upper-right advertisement frame, the advertisement for Product 2 that has the third highest Ad rank is disposed in the lower-left advertisement frame, and the advertisement for Product 7 that has the fourth highest Ad rank is disposed in the lower-right advertisement frame. Then, the display control unit 126 acquires image data for the four advertisements to be displayed and embeds the image data in the chosen advertisement frames in the web page. As a result, the display control unit 126 displays the web page containing the respective advertisements for Product 1, Product 4, Product 2 and Product 7 at the display unit 101 as depicted in the results U2 at the right side of FIG. 6. These relationships between display sites of advertisements on the web page and advertisement results may be arbitrarily determined. That is, in the present embodiment, a case is described in which the advertisement frame at the upper left of the web page is for the advertisement with the highest advertisement result, but this is not particularly limiting. Depending on circumstances, the relationships between the display sites of advertisements on the web page and the advertisement results may be freely modified.

Figure 7:
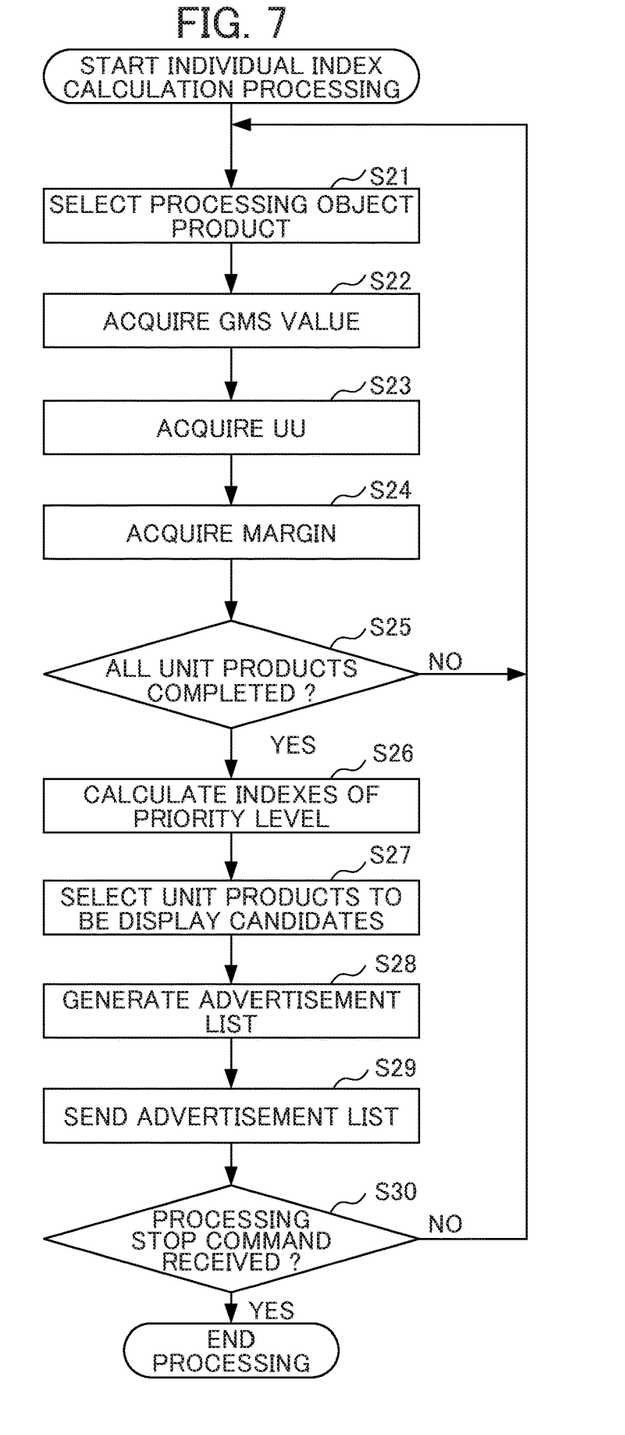
FIG. 7 is a flowchart describing the flow of the individual index calculation processing executed by the server in FIG. 3.

Now, the individual index calculation processing that is executed by the server 1 is described with reference to FIG. 7. FIG. 7 is a flowchart describing the flow of the individual index calculation processing that is executed by the server in FIG. 3. The processing for individual index calculation that is described using this flowchart is performed separately for each of the user terminals 3.

In step S21, the acquisition unit 41 or the like selects a unit product among unit products that are advertised in the selling site to be one processing object product.

In step S22, the GMS acquisition unit 71 of the acquisition unit 41 acquires information relating to the GMS value of the processing object product.

In step S23, the UU acquisition unit 72 acquires, from the web administration unit 44, information relating to unique users who have been presented with the web page in which the processing object unit product is presented.

In step S24, the margin acquisition unit 73 acquires information relating to the margin of the processing object unit product from the seller terminal 2.

In step S25, the acquisition unit 41 or the like makes a determination as to whether the processing of steps S21 to S24 has been completed for all the unit products that are advertised in the selling site. If there is still a unit product among the unit products advertised in the selling site that has not been selected as the processing object product, the result of the determination in step S25 is "No" and the processing returns to step S21. Then, a unit product that has not previously been selected is selected as the processing object product (step S21) and the GMS value, UU and margin for this processing object product are acquired (steps S22 to S24). When this sequence of processing from step S21 to S24 has been executed for each of all the unit products that are advertised in the selling site, the result of the determination in step S25 is "Yes" and the processing advances to step S26.

In step S26, on the basis of the results of the above-described sequence of processing from step S21 to S24 for each unit product that is advertised in the selling site, the index calculation unit 42 calculates Pre-Ad rank (the first index of priority level) for each of the unit products.

In step S27, the selection unit 43 selects unit products (i.e., advertisements for the unit products) to be display-candidates at the user terminal 3 side.

In step S28, the list generation unit 45 generates the advertisement list in a text data format. The advertisement list includes, for each of a predetermined number of the (advertisements of) unit products selected in step S27, the Pre-Ad rank calculated in step S26, the URL of the product advertisement, and information capable of identifying the product advertisement.

In step S29, the list generation unit 45 sends the advertisement list generated in step S28 to the user terminal 3. As mentioned above, the advertisement list sent to the user terminal 3 is used for calculation at the user terminal 3 of the second indexes (Ad rank) of priority levels for acquisition of the advertisements of the unit products for the individual user. Hence, the advertisement list is used for choosing advertisements to be displayed in accordance with the second indexes of priority levels of the advertisements for unit products, and presenting a web page (a product page of the selling site or the like) to the user with the advertisements to be displayed arranged in accordance with the second indexes of priority levels.

In step S30, the CPU 11 of the server 1 makes a determination as to whether a processing stop command has been given. This processing stop command is not particularly limited. In the present embodiment, a command to switch the server 1 into a sleep state or the like is employed. That is, if there is a command at the server 1 to switch into a sleep state or the like, the result of the determination in step S30 is "Yes" and the processing at the server 1 ends. On the other hand, as long as there is no command to switch the server 1 into a sleep state or the like, the result of the determination in step S30 is "No", the processing returns to step S21, and the subsequent processing is repeated.

Figure 8:
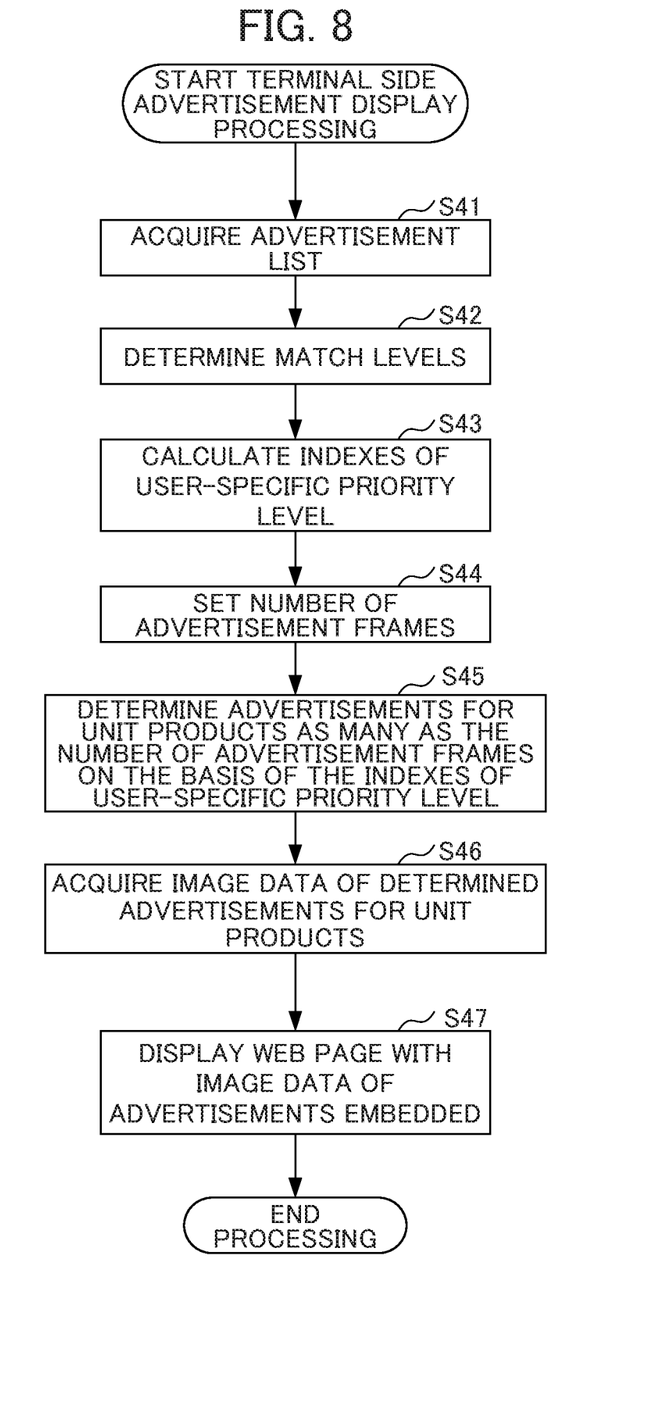
FIG. 8 is a flowchart describing the flow of the terminal side advertisement display processing executed by the user terminal in FIG. 3.

Now, the terminal side advertisement display processing executed by the user terminal 3 is described with reference to FIG. 8. FIG. 8 is a flowchart describing the flow of the terminal side advertisement display processing executed by the user terminal 3 in FIG. 3. The terminal side advertisement display processing starts when there is a page request from the user terminal 3 for a web page on which advertisements are to be displayed.

In step S41, the list acquisition unit 122 of the user terminal 3 acquires the advertisement list sent from the server 1 via the communications unit 103.

In step S42, the match level determination unit 123 determines a category for each unit product included in the advertisement list acquired in step S41, and determines a match level between that category and the individual user (the user using the user terminal 3 which is the object of processing). The meaning of the term "determines" as used here encompasses a broad definition including, in addition to computing a determination at that moment, memorizing a determination result in advance and retrieving the determination result.

In step S43, the individual index calculation unit 124 calculates an Ad rank value (the second index of the user-specific priority level) for each unit product included in the advertisement list acquired in step S41 by, for example, multiplying the Pre-Ad rank value (the first index of priority level for serving the advertisement of the unit product) with the match level of the category of that unit product determined in step S42.

In step S44, the advertisement choosing unit 125 sets the number of advertisement frames to be displayed on the web page. The meaning of the term "sets" as used here encompasses a broad definition including, in addition to the advertisement choosing unit 125 (the user terminal 3) autonomously determining the number, employing a number that has been determined in advance by other equipment such as the server 1 or the like.

In step S45, the advertisement choosing unit 125 chooses advertisements for unit products, in a number corresponding to the number of advertisement frames set in step S44, on the basis of the Ad rank values (indexes of user-specific priority levels).

In step S46, the display control unit 126 acquires image data of the advertisements for the unit products chosen in step S45 by accessing the URLs listed in the advertisement list and downloading the image data.

In step S47, the display control unit 126 displays at the display unit 101 the web page in which the image data of the advertisements acquired in step S46 is embedded in the advertisement frames. Hence, the terminal side advertisement display processing ends.

As described hereabove, the advertisement list is generated at the server 1 side. At the user terminal 3 side, advertisements to be displayed are chosen on the basis of the advertisement list with consideration given to match levels, and the user terminal 3 acquires image data of the advertisements using URLs or the like. That is, distributed processing between the server 1 and the user terminal 3 is performed. With this distributed processing, an increase in the amount of data sent to the user terminal 3 may be moderated. Furthermore, because match levels are not sent from the user terminal 3 to the server 1, the privacy of the user may be protected.

Because the load on the server 1 would be raised when match levels give consideration to viewing history, purchase history and the like that are modified in real-time as well as to user attributes, employing this distributed processing is advantageous. In particular, the distributed processing is even more advantageous when requests for web pages are at high volumes.

An embodiment of the present invention is described above but it should be noted that the present invention is not limited to the above embodiment; any modifications and improvements thereto within a scope in which the object of the present invention may be achieved are to be encompassed by the present invention.

For example, in the above embodiment, a distributed processing mode is described in which the Ad rank calculation processing is distributed between the server 1 and the user terminal 3 and executed. However, the Ad rank calculation processing may be executed at the server 1.

As another example, the above embodiment is described using advertisements as the content that are to be served to users, but this is not limiting. The provider of the present service may calculate indexes of priority levels (for example, Ad rank) for serving various kinds of content, including adverts.

As a further example, the operation history of the website at the user terminal 3 is acquired by, for example, an add-on program or the like, and the match level for each category of user is calculated by a program installed at the user terminal 3 side. However, a method for calculating match levels is not limited to the method described in the above embodiment. For example, various kinds of information required to determine match levels may be determined by addressing arbitrary questions to the user or the like. Consequently, because there is no need to send the operation history in detail, a load on the server 1 may be moderated.

In the above embodiment, the index of the priority level for serving content (an advertisement or the like) relating to a product is calculated on the basis of the GMS value, the UU and the like, but this is not particularly limiting. For example, a value calculated on the basis of a click-through rate (CTR), a conversion rate (CVR), an average order value (AOV) or the like may be used as the index of the priority level. As a specific example, if a Personal-Ad rank value is employed as the index of the priority level, in the aforementioned expression (1), a PV value representing a number of times the product page has been displayed may be employed instead of the UU value. As another example, a quantity expressed by the following expression (2) may be employed as the index of the priority level.

$$\text{Advertisement revenue} \div \text{number of displays} = \text{margin} \times (\text{quantity sold} \div \text{number of displays}) \times \text{AOV} \quad (2)$$

The meaning of the term "AOV" as used here includes an average order value of orders that users clicking on the advertisement have placed with the seller within a predetermined period after clicking on the advertisement. Products for which the AOV is calculated are not particularly limited to the advertised product. The sales promotion fee is calculated by applying the margin to a total order value for orders placed by users clicking on the advertisement within a predetermined period after clicking on the advertisement. As a further example, a quantity expressed by the following expression (3) may be employed as the index of the priority level.

$$\{\Sigma(ni \times xi \times yi)\} \div \text{number of displays} \quad (3)$$

In this expression, product i is a product that a user clicking on an advertisement A orders from the corresponding seller within a predetermined period after clicking on the advertisement A, and $\Sigma$ represents a sum from i=1 to i=m.

m represents a number of types of product ordered by the user, ni represents a number of product i that have been ordered, xi represents a promotion proportion (margin) for product i, and yi represents the price of product i. The sales promotion fee is calculated by applying the margin to the product price for each product for orders placed by users clicking on advertisements within a predetermined period after clicking on the advertisements. As more examples, quantities expressed by the following expressions (4) and (5) may be employed as the index of the priority level.

$$\text{sales promotion fee} \times \text{CTR} \quad (4)$$

$$\text{sales promotion fee} \times \text{CVR} \quad (5)$$

As described above, the sales promotion fee is calculated by, for example, the promotion proportion (margin)×product price. The CTR is calculated by, for example, number of clicks number of displays. The CVR is calculated by, for example, number sold÷number of displays. In other words, it is sufficient to employ an index of priority level for serving content relating to a product that is calculated on the basis of a first quantity, which is modified in accordance with an assigned quantity of the product assigned through the website, and a second quantity, which relates to views of the web page that is included in the website and associated with the product and that has been accessed via plural routes including at least a route other than the advertisement.

The first quantity that is modified in accordance with an assignment amount of the product assigned via the website, such as the GMS value or the like, does not give consideration only to the product being assigned by the route of the advertisement, as in the related art, but is a past results quantity of the product being assigned in the past via plural routes including at least a route other than the advertisement. Similarly, people viewing the web page are not just people who access the web page via the route of the advertisement but include people accessing the web page via plural routes including at least a route other than the advertisement. Thus, because the priority level for serving content of the corresponding product is determined on the basis of past results such as sales of the product, including sales by routes other than the advertisement, it is possible to serve more appropriate content (advertisements and the like) for each product.

A calculation method when the GMS value is employed as the first quantity that changes in accordance with an assigned amount of the product assigned through the website is not particularly limited. For example, when the GMS value is calculated on the basis of details summed over a period, the period may be a fixed period such as four hours or the like regardless of the season and the like, or may be a period of a pre-specified event (for example, a New Year holiday, Valentine's Day or the like). Further, the GMS value may be employed in a selective manner rather than simply employing raw data. For example, the GMS value that is employed may be a processed value in which lower weightings are applied to older acquired data.

In the above embodiment, UU is described as being the number of people who have viewed the product page, but this is not limiting. For example, there may be users who, rather than purchasing via the product page, put the product directly into a shopping basket and directly purchase the product at a purchase page. It may be that these users should be considered as viewers and the UU value is found on the basis of a number of users who have viewed at least one of a product page and a purchase page for the same product.

When an advertisement (content) is to be served to the user terminal 3, the server 1 may hold the image data or the like of the advertisement. Alternatively, the server 1 may not hold the image data or the like of the advertisement but output information specifying the location of the image data or the like (for example, an advertisement ID and a URL) to the user terminal 3, and the image data of the advertisement may be held by a separate image server (not illustrated in the drawings) or the like.

A timing at which products are selected for serving of advertisements (content) is not particularly limited. That is, the provider of the present service may arbitrarily specify the time range for this selection. For example, rough selections may be made in a time range in which an access load on the server 1 is high, and precise selections may be made in a time range in which an access load on the server 1 is low. Thus, access loads on the server may be moderated even while advertisement candidates are being selected.

Each above-described sequence of processing may be executed by hardware and may be executed by software. That is, the functional structures in FIG. 3 are merely examples and are not particularly limiting. In other words, it is sufficient that a function capable of executing the whole of an above-described sequence of processing is provided at the information processing system; the kinds of functional blocks to be used for executing this function are not particularly limited by the example in FIG. 3. Moreover, the locations of functional blocks are not particularly limited by FIG. 3 and may be arbitrary. A single functional block may be configured by a single unit of hardware, a single unit of software, or any combination thereof.

For example, in a case in which the processing sequence is to be executed by software, a program configuring the software is installed from a network or a storage medium into a computer or the like. This computer may be a computer incorporating special-purpose hardware. Alternatively, the computer may be a computer capable of executing various functions by installing various programs. For example, as an alternative to a server, the computer may be a smartphone, a personal computer, any of various other kinds of apparatus or the like.

For example, as well as the removable medium that is distributed separately from the main body of the equipment for supplying the program to users, a recording medium containing such a program may be constituted by a recording medium or the like that is supplied to users in a state of being incorporated in the main body of the equipment.

It should be noted that the steps in the present specification describing each program recorded in the storage medium include not only processing executed in a time series following this sequence, but also processing that is not necessarily executed in a time series but is executed in parallel or separately. Moreover, the term "system" as used in the present specification is intended to include the whole of equipment constituted by plural devices, plural units and the like.

In other words, an information processing apparatus that functions as a server of an information processing system in which the present invention is employed may be embodied in various modes including the configuration described below. That is, the information processing apparatus (for example, the server 1 in FIG. 3) includes:

first index calculating means (for example, the index calculation unit 42 in FIG. 3) for calculating, for content (for example, advertisements) of display-candidates relating to a product to be assigned through a website (for example, a selling site), first indexes (for example, Pre-Ad rank) representing priority levels for display of the content;

selecting means (for example, the selection unit 43 in FIG. 3) for selecting the content of a number of the display-candidates on the basis of the first indexes; and list generating means (for example, the list generation unit 45 in FIG. 3) for generating a list including the first indexes for the content of the selected display-candidates and location information of the content, and executing control to send the list to another information processing apparatus (for example, the user terminal 3-1 in FIG. 3).

The another information processing apparatus performs operations including:

acquiring (for example, acquisition by the list acquisition unit 122 in FIG. 3) the list sent from the information processing apparatus;

on the basis of an operation history (for example, a match level) of a user that is acquired by the another information processing apparatus, calculating (for example, calculation by the individual index calculation unit 124 in FIG. 3) second indexes (for example, Ad rank) representing user-specific priority levels for display of the display-candidate content included in the list;

on the basis of the first indexes and the second indexes, choosing (for example, choosing by the advertisement choosing unit 125 in FIG. 3) content to be acquired among the display-candidate content included in the list; and acquiring the chosen content on the basis of the location information and displaying the content (for example, display by the display control unit 126 in FIG. 3).

The information processing apparatus may be configured such that calculating the first indexes further comprises calculating the first index for each of one or more products on the basis of a first quantity and a second quantity, the first quantity (for example, a GMS value acquired by the GMS acquisition unit 71 in FIG. 3) being modified in accordance with an assigned quantity of the each of one or more products, and the second quantity (for example, a UU value acquired by the UU acquisition unit 72 in FIG. 3) relating to a web page that has been accessed for viewing, is included in the website and is associated with the each of one or more products. The another information processing apparatus may perform operations including:

for each of products of the display-candidate content, calculating (for example, calculation by the match level determination unit 123 in FIG. 3) a correlation between the each of products in relation to the user and the user; and, for the each of products, calculating the second index on the basis of the first index included in the acquired list and the calculated correlation.

EXPLANATION OF REFERENCE NUMERALS 1 server,
2 seller terminal,
3 user terminal,
11 CPU,
41 acquisition unit,
42 index calculation unit,
43 selection unit,
44 web administration unit,
45 list generation unit,
71 GMS acquisition unit,
72 UU acquisition unit,
73 margin acquisition unit,
102 CPU,
121 user information administration unit,
122 list acquisition unit,
123 match level determination unit,
124 individual index calculation unit,
125 advertisement choosing unit,
126 display control unit,
300 seller database

What is claimed is:

1. A method comprising:

for each piece of a plurality of pieces of display-candidate content relating to a product:
  acquiring and storing, by a server, in a database of at least one memory, a value relating to a sale price and a sale quantity of the product from a log of a selling site, the sale quantity being a number of units of the product sold through the selling site in a predetermined period;
  acquiring and storing, by the server, in the database, a number of unique users who have viewed a web page on which the product is presented;
  acquiring and storing, by the server, in the database, weighting information relating to an advertisement proportion; and
  calculating, by the server, based on the stored value relating to the sale price and the sale quantity, the stored number of unique users who have viewed a web page on which the product is presented and the stored weighting information, a first index score representing a priority level for display of a piece of display-candidate content;
selecting, by the server, a predetermined number of the pieces of display-candidate content on the basis of first index scores;
  generating, by the server, a list including pieces of location information about the selected pieces of display-candidate content and the first index score calculated for the respective selected pieces of display-candidate content; and
controlling, by the server, a network communication interface to transmit the generated list to a user terminal device, thereby moderating an amount of data transmitted to user terminal devices while providing a list generated based on at least one of a viewing or purchase history, wherein
the method further comprises:
  acquiring, by the user terminal device, the list transmitted from the server;
  on the basis of an operation history of a user that is acquired by the user terminal device, calculating, by the user terminal device, for each of the pieces of display-candidate content included in the list, a second index score representing a user-specific priority level for display of the respective piece of display-candidate content included in the list;
  on the basis of the first index score and the second index score, choosing, by the user terminal device, content to be acquired among the pieces of display-candidate content included in the list;
acquiring, by the user terminal device, the chosen content on the basis of the location information; and
controlling, by the user terminal device, a display to display the chosen content,
wherein in the operations performed in the server, calculating the first index score further includes calculating the first index score for each of one or more products on the basis of a first quantity and a second quantity, the first quantity being modified in accordance with an assigned quantity of the product, and the second quantity relating to a web page included in a predetermined website and accessed by a user for viewing, the web page being relating to the product, and
wherein the method further comprises:
for each of products of the display-candidate content, calculating, by the user terminal device, a correlation between the product in relation to the user; and
for the each of the one or more products, calculating, by the user terminal device, the second index score on the basis of the first index score included in the acquired list and the calculated correlation.

2. A computer program product comprising two non-transitory computer-readable storage mediums, wherein
the two non-transitory computer-readable storage mediums comprise a first medium and a second medium,
the first medium stores program code that is executable by a computer that comprises at least one processor, the program code of the first medium being executable to cause a server to perform server operations comprising:
for each piece of a plurality of pieces of display-candidate content relating to a product:
acquiring and storing, in a database of at least one memory, a value relating to a sale price and a sale quantity of the product from a log of a selling site, the sale quantity being a number of units of the product sold through the selling site in a predetermined period;
acquiring and storing, in the database, a number of unique users who have viewed a web page on which the product is presented;
acquiring and storing, in the database, weighting information relating to an advertisement proportion; and
calculating, based on the stored value relating to the sale price and the sale quantity, the stored number of unique users who have viewed a web page on which the product is presented and the stored weighting information, a first index score representing a priority level for display of a piece of display-candidate content;
selecting a predetermined number of the pieces of display-candidate content on the basis of the first index score;
generating a list including pieces of location information about the selected pieces of display-candidate content and the first index score calculated for the respective selected pieces of display-candidate content; and
controlling a network communication interface to transmit the generated list to a user terminal device, thereby moderating an amount of data transmitted to user devices while providing a list generated based on at least one of a viewing or purchase history,
the second medium comprises computer code which causes a user terminal device to perform operations comprising:
acquiring the list transmitted from the server;
on the basis of an operation history of a user that is acquired by the second user terminal device, calculating, for each of the pieces of display-candidate content included in the list, a second index score representing a user-specific priority level for display of the respective piece of display-candidate content included in the list;
on the basis of the first index score and the second index score, choosing content to be acquired among the pieces of display-candidate content included in the list;
acquiring the chosen content on the basis of the location information; and
controlling a display to display the chosen content,
in the operations performed in the server, calculating the first index score further comprises calculating the first index score for each of one or more products on the basis of a first quantity and a second quantity, the first quantity being modified in accordance with an assigned quantity of the product, and the second quantity relating to a web page included in a predetermined website and accessed by a user for viewing, the web page being relating to the product,
the program code stored in the second medium is further configured to cause the user terminal device to:
for each of products of the display-candidate content, calculate a correlation between the product in relation to the user; and
for the each of the one or more products, calculate the second index score on the basis of the first index score included in the acquired list and the calculated correlation.

3. A system comprising:
a server; and
a user terminal device, wherein
the server comprises:
a network communication interface configured to communicate with user terminal devices;
at least one memory that stores program code and a database; and
at least one processor that executes the program code stored in the at least one memory to perform operations comprising:
for each piece of a plurality of pieces of display-candidate content relating to a product:
acquiring and storing, in the database, a value relating to a sale price and a sale quantity of the product from a log of a selling site, the sale quantity being a number of units of the product sold through the selling site in a predetermined period;
acquiring and storing, in the database, a number of unique users who have viewed a web page on which the product is presented;
acquiring and storing, in the database, weighting information relating to an advertisement proportion; and
calculating, based on the stored value relating to the sale price and the sale quantity, the stored number of unique users who have viewed a web page on which the product is presented and the stored weighting information, a first index score representing a priority level for display of a piece of display-candidate content;

selecting a predetermined number of the pieces of display-candidate content on the basis of the first index score;

generating a list including pieces of location information about the selected pieces of display-candidate content and the first index score calculated for the respective selected pieces of display-candidate content; and controlling the network communication interface to transmit the generated list to the user terminal device, thereby moderating an amount of data transmitted to user terminal(s) while providing a list generated based on at least one of a viewing or purchase history, and wherein the user terminal device comprises a processor and a memory, and the processor of the user terminal device executes program code stored in the memory of the user terminal device to perform operations comprising:

acquiring the list transmitted from the server;

on the basis of an operation history of a user that is acquired by the user terminal device, calculating, for each of the pieces of display-candidate content included in the list, a second index score representing a user-specific priority level for display of the respective piece of display-candidate content included in the list;

on the basis of the first index score and the second index score, choosing content to be acquired among the pieces of display-candidate content included in the list;

acquiring the chosen content on the basis of the location information; and controlling a display to display the chosen content, wherein in the operations performed in the server, calculating the first index score further comprises calculating the first index score for each of one or more products on the basis of a first quantity and a second quantity, the first quantity being modified in accordance with an assigned quantity of the product, and the second quantity relating to a web page included in a predetermined website and accessed by a user for viewing, the web page being relating to the product, the program code stored in the memory of the user terminal device is further configured to cause the processor of the user terminal device to:

for each of products of the display-candidate content, calculate a correlation between the product in relation to the user, and for the each of the one or more products, calculate the second index score on the basis of the first index score included in the acquired list and the calculated correlation.

4. The system according to claim 3, wherein the list includes first index scores, which are Pre-Ad rank values, uniform resource locators (URLs) at which image data of the product is stored, and information representing categories of corresponding unit products.

5. The system according to claim 3, wherein the weighting information is margin information that refers to the advertisement proportion.

6. The system according to claim 3, wherein the at least one processor is further configured to execute the program code stored in the at least one memory to: calculate the first index score by multiplying the weighting information by the value relating to the sale price and the sale quantity, divided by the number of unique users.

* * * * *